(12) United States Patent
Van Ee

(10) Patent No.: US 6,510,736 B1
(45) Date of Patent: Jan. 28, 2003

(54) LIQUID DEPTH SENSING SYSTEM

(76) Inventor: William J. Van Ee, 8975 Indian Ridge Rd., Cincinnati, OH (US) 45243

( * ) Notice: Subject to any disclaimer, the term of this patent is extended or adjusted under 35 U.S.C. 154(b) by 37 days.

(21) Appl. No.: 09/694,373

(22) Filed: Oct. 24, 2000

(51) Int. Cl.[7] ............................................. G01F 23/14
(52) U.S. Cl. ..................... 73/299; 73/302; 73/864.35; 73/299
(58) Field of Search ................... 73/299, 302, 864.35

(56) References Cited

U.S. PATENT DOCUMENTS

| | | | |
|---|---|---|---|
| 1,623,832 A | * | 4/1927 | Durant ...................... 191/12.4 |
| 1,731,928 A | | 10/1929 | Johnson |
| 2,502,578 A | | 4/1950 | McDaniel |
| 2,734,458 A | | 2/1956 | Hayes |
| 3,213,795 A | | 10/1965 | Parks et al. |
| 3,587,670 A | * | 6/1971 | Brailsford .................... 141/35 |
| 3,794,789 A | | 2/1974 | Bynum |
| 3,937,596 A | | 2/1976 | Braidwood |
| 4,176,550 A | | 12/1979 | McClure |
| 4,297,081 A | | 10/1981 | Irvin |
| 4,737,695 A | * | 4/1988 | Kim ........................... 318/130 |
| 4,889,662 A | * | 12/1989 | Smith .......................... 261/35 |
| 4,972,709 A | | 11/1990 | Bailey, Jr. et al. |
| 5,059,954 A | | 10/1991 | Beldham et al. |
| 5,163,324 A | | 11/1992 | Stewart |

FOREIGN PATENT DOCUMENTS

| | | |
|---|---|---|
| DE | 279947 | 6/1990 |
| JP | 60-210724 | 10/1985 |
| JP | 2-259428 | 10/1990 |
| SU | 939947 | 6/1982 |

OTHER PUBLICATIONS

Considine, Douglas M., "Process and Controls Handbook," McGraw–Hill Book Co. (no publication date shown), pp. 5–16 through 5–18.

* cited by examiner

Primary Examiner—Daniel S. Larkin
Assistant Examiner—André K. Jackson
(74) Attorney, Agent, or Firm—Richard C. Litman

(57) ABSTRACT

The present invention is a liquid depth sensing system utilizing the bubble tube or purge operating principle. In this system, a pneumatic tube extends downwardly into the liquid, and air (or other gas) passes through the tube to bubble from the lower end thereof. The air or gas pressure within the tube is equal to the head pressure of the liquid, thus allowing the liquid depth to be determined by measuring the air or gas pressure. The present system may be applied to either open or closed liquid containers (e. g., fuel quantity indication), and may be adapted for use in the bottling industry.

16 Claims, 8 Drawing Sheets

LIQUID DEPTH SENSING SYSTEM

BACKGROUND OF THE INVENTION

1. Field of the Invention

The present invention relates generally to devices for measuring the quantity, or more accurately the depth or pressure head, of a volume of liquid in a container. More specifically, the present invention relates to air bubble tube or "purge" type systems, wherein a gas is pumped to the bottom of the liquid tank and the pressure of the gas is measured to determine the pressure head, and thus the depth, of the liquid in the tank.

2. Description of the Related Art

The determination of a liquid quantity in a tank or other container is of great importance in a number of different fields, including the bottling and beverage industry (in both manufacturing and retail levels), vehicle fuel systems, closed lubrication systems, and a number of other applications. Accordingly, a number of different principles of measuring the quantity of a liquid in a tank or container, have been developed in the past. These different principles range from a simple calibrated stick, rod, or sight gauge, to float and arm type systems (as commonly used in vehicle fuel tanks), capacitance type systems for certain liquids, pressure sensing transducers disposed in the container bottom, to air bubble or "purge" type systems related to the present invention.

The air bubble or purge system operates essentially by providing pressurized air, which is forced through a tube extending downwardly to the bottom of the tank or container. When the air pressure is slightly above the liquid pressure at the tube outlet, the air pressure will force air bubbles from the lower or outlet end of the tube, thereby stabilizing the air pressure within the tube. This air pressure may then be equated to the pressure head of the liquid, and thus the depth of the liquid in the container. By knowing the volume of the container, a determination of the quantity or volume of liquid in the tank or container is made.

However, such purge systems as developed in the prior art have various drawbacks and deficiencies. Conventionally, such purge systems have relied upon a separate mechanical pressure regulator, which regulates pressure from a relatively high pressure source (pneumatic pump, compressed air source, etc.). Where a motor is used to supply the air pressure for such systems, the motor must be somewhat larger and more powerful than required to produce pressure sufficient to equal the pressure head of the liquid, as the motor must provide sufficient additional pressure over and above the regulated pressure. This, and the fact that the motor must run continuously, result in considerable energy usage and render such systems impracticable for many applications. Moreover, the mechanical regulators used in such systems are relatively delicate, requiring frequent adjustment due to vibration, ambient temperature and pressure changes, etc, and thus are not suitable for installations in vehicles, factory lines, etc.

Thus, a need will be seen for an air bubble or purge type liquid measuring system which overcomes these and other deficiencies in the prior art. Rather than using a continuously operating motor to supply the air pressure for the system, the present invention actuates the pneumatic motor only as necessary to supply air (or other gas) to the down tube or dip tube which extends into the liquid tank or container. The motor is controlled by a precision regulator and novel electrical and pneumatic circuitry providing such precision control. The present purge type system is capable of providing liquid depth sensing to extremely precise tolerances if desired, on the order of the diameter of a single bubble escaping from the dip tube. This, and other features, provide numerous advantages in the bottling industry, auto manufacturing industry, and other areas where precision filling of containers is required.

The present depth sensing system also lends itself well to applications in vehicle fuel tanks and systems, as the present system does not require any electrical wiring or circuitry within the fuel tank or system. The only intrusive elements within the tank or container, are the dip tube and vent tube which supply the pressure information to the sensing apparatus. Heretofore, such systems were impracticable for use in such vehicle fuel systems due to their weight, bulk, energy usage, maintenance requirements, and relative lack of sensitivity due to the relatively large continuous use motors required and the regulators used. The present system provides numerous advantages over such prior art devices.

A discussion of the related art of which the present inventor is aware, and its differences and distinctions from the present invention, is provided below.

U.S. Pat. No. 1,731,928 issued on Oct. 15, 1929 to Edward E. Johnson, titled "Constant Liquid Level Apparatus," describes a device, for maintaining an essentially constant liquid level within a closed tank, filling the tank as the level drops and shutting off flow to the tank as the level rises to the point desired. The Johnson system operates on an entirely different principle than the purge line system of the present invention, with Johnson utilizing a pair of complementary mercury type switches in his system. Moreover, Johnson does not disclose any means of displaying the depth of the liquid in the tank, as he has no motivation to do so due to the constant level maintained by his system.

U.S. Pat. No. 2,502,578 issued on Apr. 4, 1950 to John I. McDaniel, titled "Liquid Level Control Device," describes a system utilizing a pair of electrodes within a tank. When the liquid level drops below the lower electrode, a motor is energized to pump liquid into the tank. When the liquid level reaches the higher electrode, the motor is shut off. The McDaniel device thus uses an entirely different principle of operation from that of the present invention, and controls the liquid level only through a relatively broad range determined by the difference in heights of the two electrodes. Moreover, McDaniel does not provide any display of liquid quantity with his system.

U.S. Pat. No. 2,734,458 issued on Feb. 14, 1956 to Thomas B. Hayes, titled "Pump Speed Control Arrangement," describes a compound system controlling a pump motor primarily by means of a "liquid rheostat" (i. e., a series of capacitor plates) within the tank. The capacitance of the plates varies as the liquid level varies, thereby controlling the speed of an output pump motor. Hayes also utilizes a pair of floats, with the lower float cutting off the motor and the higher float causing the motor to run at maximum speed. The inclusion of electrical components within the tank, and the lack of any liquid level display, both teach away from the present invention with its purge type system providing an extremely accurate readout of liquid level in a tank or container.

U.S. Pat. No. 3,213,795 issued on Oct. 26, 1965 to John W. Parks et al., titled "Fluid Handling System," describes a bubble tube or purge type device wherein pressure from the pneumatic system is supplied to a smaller tank having two compartments. The first compartment receives the pneumatic pressure, while the second compartment contains a series of capacitance plates ("liquid rheostat") therein. When the level of the main tank drops, the pneumatic pressure drops, causing the level of the auxiliary tank first chamber to rise and the second chamber to fall, thereby exposing more of the plates to control a reduction in the pump motor speed. The pneumatic motor runs constantly, unlike the present invention, to provide the required air supply to operate the system. Moreover, Parks et al. do not provide any display of the liquid level in the tank(s).

U.S. Pat. No. 3,794,789 issued on Feb. 26, 1974 to Johnnie J. Bynum, titled "Pressure Sensitive Control For Pump Regulator," describes an electrical pump control circuit which shuts down the liquid pump in the event the pump cannot draw sufficient liquid, thereby preventing pump motor burnout. The Bynum system operates by measuring the pneumatic pressure captured within a closed tank. If the pressure drops to a certain point, indicating that the liquid volume in the tank has dropped and allowed the air volume in the tank to expand, a circuit shuts off the pump motor. Bynum does not use a bubble pipe or purge system for measuring the depth of the liquid in the tank, as provided by the present invention, and moreover, Bynum does not provide any display of the liquid quantity within the tank.

U.S. Pat. No. 3,937,596 issued on Feb. 10, 1976 to Robert O. Braidwood, titled "Fluid Pump Driving Control," describes a purge type system for controlling the operation of a hydraulic pump, which in turn controls a liquid pump motor. The air pump for the Braidwood system must operate continuously in order to supply pressure to an electromechanical regulator. The regulator in turn controls the swash plate of the hydraulic pump in order to control the hydraulic output of the pump and speed of a corresponding hydraulic motor which drives the liquid pump. As in other purge type systems noted above, Braidwood uses the purge system only to control a liquid pump, either directly or indirectly, to control the liquid level within a container. Braidwood does not disclose an intermittently operating air pump nor any quantity display.

U.S. Pat. No. 4,176,550 issued on Dec. 4, 1979 to Charles L. McClure, titled "Depth/Flow Monitoring Instrumentation, " describes a bubble tube or purge type system utilizing pressurized gas, i. e., "refrigerant cans," col. 2, line 43. Accordingly, McClure does not provide any form of motor and pneumatic pump for his system. While McClure does provide a means of recording the gas pressure, and thus the pressure head or depth of the liquid, he does so only with a recording chart which is driven by a "sensing element." Such a chart provides only a history of liquid depth, and is not suitable for use as a quantity gauge (e. g., fuel gauge, etc.), as provided in the present invention. Moreover, the McClure system is only adaptable to a closed container, whereas different embodiments of the present system may be adapted to open tanks as well.

U.S. Pat. No. 4,297,081 issued on Oct. 27, 1981 to William A. Irvin, titled "Liquid Level Control System," describes a purge level sensing system which supplies pneumatic pressure to a mercury manometer. The manometer in turn controls a series of relays which actuate one or more liquid pump motors, depending upon the height of the column of mercury. The Irvin system requires the pump motor to run continuously, unlike the intermittent motor operation provided by the present invention. While Irvin provides an approximate form of level indication by means of a series of warning lights indicating which motors are operating and high and low level alarms, he does not provide a continuously incremental gauge display of the liquid level, as in the present invention.

U.S. Pat. No. 4,972,709 issued on Nov. 27, 1990 to James R. Bailey, Jr. et al., titled "Pump Control System, Level Sensor Switch And Switch Housing," describes a float type control system for use in the downhole of an oil well. The Bailey, Jr. et al. system does not utilize any form of bubble purge principle, as provided in the present invention. Moreover, Bailey, Jr. et al. do not provide any means of displaying the level of a liquid in a tank or other container, as provided by the present invention.

U.S. Pat. No. 5,059,954 issued on Oct. 22, 1991 to Paul M. Beldham et al., titled "Liquid Level Sensing System," describes a purge type system for distinguishing between line losses or leaks, and actual depletion of the liquid in the tank. The Beldham system operates the purge pump motor only periodically, with the pump building pressure as desired. If the pressure builds up relatively rapidly, a leak in the system is indicated and an alarm is provided to indicate the need for maintenance. Slower pressure buildup indicates normal depletion of the liquid in the container, with no maintenance being required. The Beldham et al. system does not actuate the purge pump motor to maintain a constant pneumatic pressure very slightly above the liquid pressure head, as provided by the present invention. Rather, Beldham et al. allows pressure in the system to bleed down periodically. This results in an inaccurate indication of the liquid level or height in the tank. In contrast, at least one embodiment of the present system provides an accurate display of the liquid level at all times, thereby serving as an accurate fuel or other quantity gauge, etc.

U.S. Pat. No. 5,163,324 issued on Nov. 17, 1992 to Glen A. Stewart, titled "Bubbler Liquid Level Sensing System," describes a system in which the pneumatic pump motor is periodically cycled by means of a timer, rather than according to demand for pneumatic output as in the present system. Stewart cycles his pump on and off by means of a timer, which results in the quantity display failing to be updated during those periods when the timer has shut down the pump. In contrast, the present system is also adaptable for use in a vehicle fuel system, and provides a continuous and accurate readout or display of the fuel quantity in the tank. Moreover, the Stewart system periodically vents the pneumatic pressure and vapor return lines to the atmosphere. This is unacceptable in most vehicle fuel tanks, where capture of fuel vapors is required by Environmental Protection Agency regulations. The present system may be used with an open tank, but the vapor return line (ambient tank pressure) returns to the interior of the fuel tank, rather than selectively venting to the atmosphere, as in the Stewart system. The present invention also includes a novel lower or outlet end configuration for the dip tube within the tank, which configuration is not disclosed in any of the prior art of which the present inventor is aware. This outlet end configuration provides a relatively large volume which results in extremely rapid reactions to pressure changes in the system, e. g., as the tank is filled, to actuate the pneumatic motor to preclude entry of fuel into the pneumatic system.

Soviet Patent Publication No. 939,947 published on Jun. 30, 1982 describes (according to the English abstract) a bubble or purge type liquid depth measuring system utilizing compressed air for supplying the air within the down tube of the system. The device of the Soviet Patent Publication is particularly adaptable to relatively large and rapid changes in the depth of the liquid being measured, and hence utilizes relatively highly pressurized pneumatic sources. As a result, the device of the Soviet Patent Publication does not have a pneumatic pump motor and is more closely related to the device of the '550 U.S. Patent to McClure, discussed further above, than to the present invention. Also, no disclosure of any means for displaying the depth of the liquid is apparent in the Soviet Patent Publication.

Japanese Patent Publication No. 60-210,724 published on Oct. 23, 1985 describes (according to the English abstract) the basic principle of purge pipe liquid depth measurement. The '724 Japanese Patent Publication utilizes an inlet valve for regulating pressure from a pneumatic source upstream of the valve. Thus, the supply pressure must be higher than required for filling the dip tube in the tank, thus requiring a larger and heavier motor (or compressed air tank) than that required by the present invention, which regulates pressure by controlling the pneumatic pump motor, rather than reducing pressure downstream of the motor and pump. Moreover, no liquid level display means is apparent in the '724 Japanese Patent Publication, whereas such display means is a part of at least one embodiment of the present invention.

East German Patent Publication No. 279,947 published on Jun. 20, 1990 describes (according to the English abstract) a purge type system incorporating intermittent measurement. Gas is blown through the pneumatic system according to predetermined measured values, time, or system pressure. The present invention utilizes system pressure to control the operation of the motor driving the pneumatic pump of the system, but the intermittent actuation of the motor occurs on demand to keep the down tube filled with air continuously, thus providing a continuous reading of the pressure within the tube, and corresponding depth of the liquid, at all times. Moreover, no means of displaying the liquid depth or quantity is apparent in the '947 East German Patent Publication, while such display means is a part of at least one embodiment of the present invention.

Japanese Patent Publication No. 2-259,428 published on Oct. 22, 1990 describes (according to the English abstract) a purge type system utilizing a continuously operating pneumatic pump motor with a restrictor or regulator in the line downstream of the motor and pump. The disadvantages of such continuously operating systems and the relatively large motors required, have been noted further above. In addition, no means of displaying the depth of the liquid is apparent in the '428 Japanese Patent Publication. Also, the '428 Japanese Patent Publication teaches away from the down tube outlet of the present invention, by providing a relatively narrow outlet nozzle at the bottom end of the device. The present system controls bubble size and output by means of motor operation, instead.

Finally, pages 5–16 through 5–18 of an undated copy of "Process Instruments And Controls Handbook" (McGraw-Hill Book Co.), second edition, describe various means of measuring the head pressure or depth of a quantity of liquid. Page 5–18 describes the conventional air bubble tube or purge system, upon which the present invention is based. This description teaches away from the present invention, in that it states that "air pressure is set at a value slightly greater than the hydrostatic pressure for maximum level and its rate of flow adjusted by the needle valve . . . " While the present system may incorporate a needle valve for flow adjustment, the present system utilizes the pressure transducer of the system to provide a signal to the motor for actuation or stopping. The motor thus need not be larger than that required to provide just the proper pressure to equal the pressure head of a full tank or container, and also need not run continuously, as in the case of the system described in the Process Instruments Handbook. Moreover, this publication states on page 5–16 that "The minimum range of measurement with conventional pressure gages employing a sensitive spring and bellows assembly is about 0 to 5 in. of water." The present invention, with its incorporation of solid state transducer devices and novel motor operation, provides accuracies on the order of one to two orders of magnitude better than that stated in the Process Instruments Handbook.

None of the above inventions and patents, taken either singly or in combination, is seen to describe the instant invention as claimed.

SUMMARY OF THE INVENTION

The present invention comprises various embodiments of a liquid depth sensing system which utilizes the bubble tube or purge pipe principle of operation. The present purge system provides at least two distinct improvements over such systems which have been developed in the past, enabling the present system to provide considerably greater accuracy and response time for certain operations (bottling, etc.). Significantly greater accuracy is provided by eliminating the conventional electromechanical pressure regulator, and operating the pneumatic pump motor by means of a pressure transducer and novel circuit so the motor not only provides the required pressure, but also acts to regulate the pressure by means of intermittent operation as controlled by the electrical circuit of the present invention. This much greater accuracy enables the present purge system to be used in applications where relatively small changes in liquid depth or head pressure must be measured, such as vehicle fuel tanks, bottling operations, etc.

Another significant advance over the prior art is the provision of a "bell," or larger volume portion, at the lower end of the dip tube. This larger volume entraps a greater volume of air or gas in the lower end of the dip tube. This is particularly valuable during bottling operations or in any situation where rapid filling of a container must be accomplished. The air or gas pressure within the dip tube (and bell portion) will always equal the head pressure of the liquid surrounding the dip tube. Thus, the total volume of air or gas within the widened bell portion of the tube will be proportional to the head pressure. In bottling operations, where the head pressure of the liquid varies only over several inches, the air or gas is compressed very little, and essentially retains its original volume. However, the gas within the bell portion of the tube is forced upwardly in the tube to a height or extent greater than that of the upper surface of the liquid during a rapid filling operation, due to the relative constriction of the narrower dip tube. This results in the pressure signal from the rising liquid level, being transmitted to the transducer much more rapidly than occurs in a conventional system. The transducer thus may provide a much more rapid shutoff of the incoming liquid. This enables the bottle or container to be filled at a much faster rate than was heretofore possible, and still achieve the required accuracy.

Accordingly, it is a principal object of the invention to provide an improved liquid depth sensing system for rapidly and precisely measuring the depth or pressure head of a liquid, for determining the quantity of a liquid in a container, bottling operations, and other related applications.

It is another object of the invention to provide an improved liquid depth sensing system which incorporates the bubble tube or purge principle of operation, with the interior of the tank or container incorporating the present system being devoid of any electrical componentry associated with the present system for safe measurement of combustible liquids in a tank or container.

Another object of the present invention is to provide an improved liquid depth sensing system which is adaptable to either open or closed tanks or containers.

It is a further object of the invention to provide an improved liquid depth sensing system utilizing a pneumatic motor and pump as the pressure regulating means of the device and eliminating a conventional pressure regulator, thus providing extremely accurate operation under adverse conditions for motor vehicle, factory line, and other harsh operating environments.

An additional object of the invention is to provide an improved liquid depth sensing system adaptable to any orientation and to a broad range of temperatures due to the use of solid state componentry and elimination of electromechanical regulating means.

Still another object of the invention is to provide an improved liquid depth sensing system incorporating a bell mouth in the dip tube for more rapid response during bottling or other filling operations.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
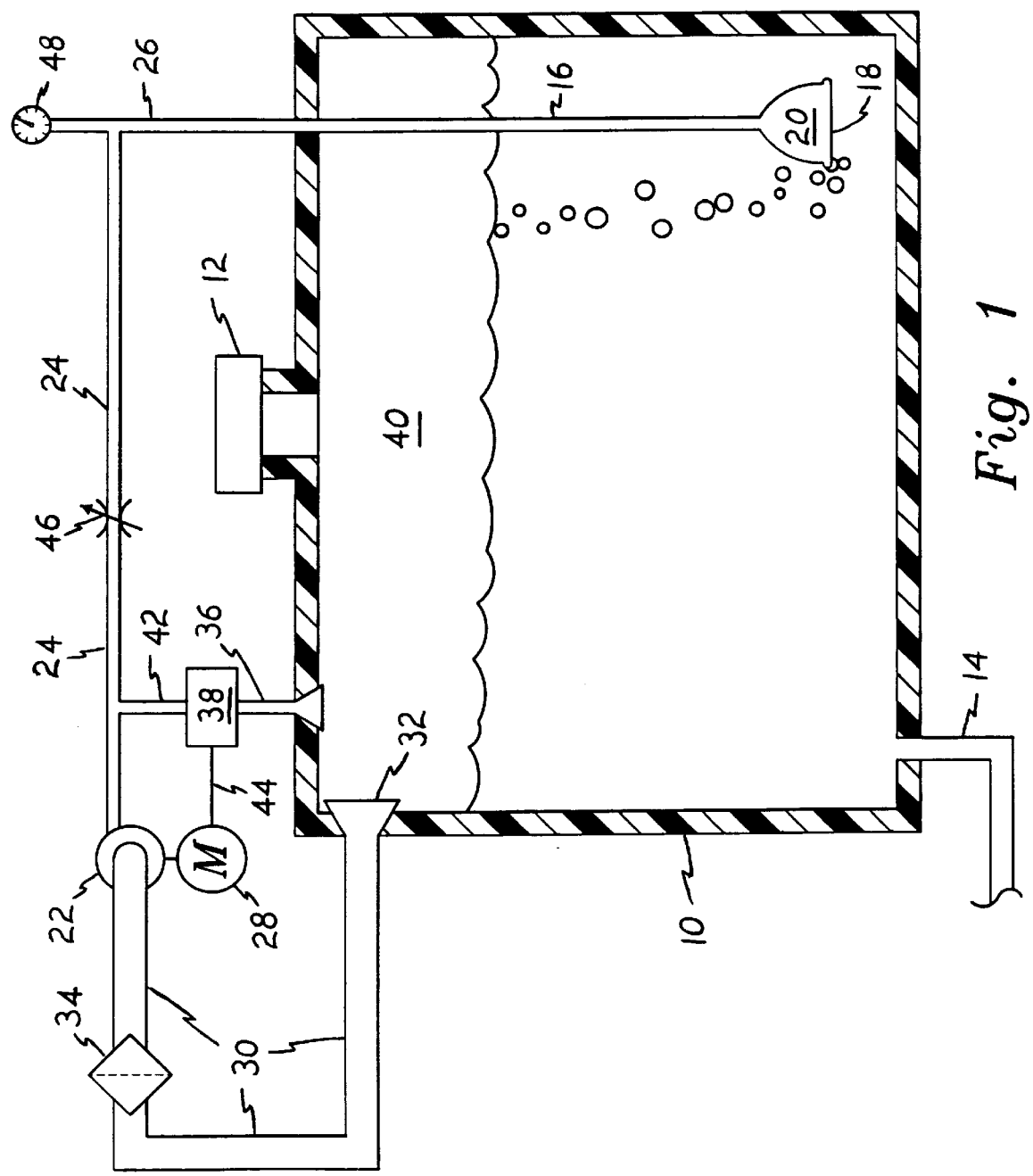
FIG. 1 is a schematic elevation view of a first embodiment of the present liquid depth sensing system, installed with a closed container.

The present invention comprises several embodiments of a liquid depth sensing system, incorporating the bubble tube or purge principle of operation. FIG. 1 of the drawings provides a schematic view of a first embodiment of the present system, installed in a closed liquid tank or container 10, e. g., automobile or aircraft fuel tank, stationary storage tank, etc. The tank 10 includes a conventional inlet or filler port and cap 12 and an outlet line 14, as is known in the art. The purge type system of the embodiment of FIG. 1 penetrates the tank 10 at only three additional points, with none of the componentry of the present system introducing any electrical components, wiring, or electrical energy into the interior of the tank 10.

A down tube or dip tube 16 penetrates the tank 10, and has an open lower end 18 positioned close to the bottom of the tank 10. The lower end 18 of the dip tube 16 may incorporate a relatively wider diameter bell mouth 20, for reasons explained further below. However, for liquid quantity monitoring or auditing purposes, particularly where the quantity of liquid changes relatively slowly over a period of time (e. g., the quantity of fuel in an automobile or aircraft fuel tank over a period of a few hours), the bell mouth 20 may not be required. The dip tube 16 serves to deliver air (or other gas) into the tank 10, with the gas pressure within the dip tube 16 being essentially equal to the pressure of the liquid at the bottom end 18 of the dip tube 16, when air (or other gas) is forced from the bottom end 18 of the dip tube 16.

A pneumatic pump 22 provides air or gas to the dip tube 16, by means of a gas delivery line 24 extending from the pump 22 to the upper end 26 of the dip tube 16. The pump 22 is driven by an electrically powered drive means 28 of some sort, e. g., electric motor M, solenoid actuating a lever arm, etc. It is important to note that the electric drive means 28, as well as the pneumatic pump 22 driven by the drive means 28, is disposed externally to the tank 10, as is clearly shown in FIG. 1 of the drawings. In fact, all electrical componentry of the present invention is located externally to the interior volume of the tank 10, or other tank and system embodiments of the present invention, in order to preclude any electrical energy passing into or through any part of the tank 10 interior and/or its contents.

In the closed tank system of FIG. 1, the air or gas inlet line 30 has an inlet opening 32 situated within the tank 10. In this manner, the air or other operative gas used in the present liquid depth sensing system is recycled, and does not escape from the closed system. This is critical in automotive and other motor vehicle systems, where Environmental Protection Agency regulations require that fuel vapors be captured prior to escaping into the atmosphere. Thus, the present closed system of FIG. 1 recirculates the air (or other operative gas) used in the system, and any fuel and/or other vapors entrained within that air or gas, to prevent escape of fuel and/or other vapors into the atmosphere. A filter 34 may be installed in the inlet line 30, to capture material which could damage the pump 22 or other components.

An additional pressure sensing line 36 extends from the upper portion of the tank 10, to communicate with a differential pressure sensing device 38. The sensor or transducer 38 communicates with the inlet line 30 by means of the common air or gas volume 40 within the upper portion of the tank 10. Another pressure sensing line 42 extends from the gas delivery line 24, to connect with the opposite side or port of the differential pressure sensing device 38. Another way of stating this is to think of the pressure sensor 38 being installed in a continuous line 36, 42, extending between the tank interior 40 and the gas delivery line 24. The sensor 38 blocks flow through this line pair 36, 42, but senses the pressure difference between the two sides of the system.

Preferably, the sensor 38 is a solid state electronic device which senses the supply or delivery pressure within the delivery line 24 by means of the pressure sensing line 42, and compares that pressure with the ambient pressure within the gas volume 40 of the tank 10 (and equal inlet line 30 pressure, since the inlet line communicates directly with the upper volume 40). Such solid state devices are extremely accurate and reliable, and further provide an electric output signal for driving a pressure or quantity gauge or (in the case of the embodiment of FIG. 1) controlling the electric drive means 28. The electronic output signal is delivered to control the electronic drive means 28 by an electric connection 44, extending between the transducer 38 and the motor or drive means 28.

It should be noted at this point, that the pneumatic pump 22 does not run continuously, as in other purge type systems of the prior art. Rather, when gas pressure in the delivery line 24 drops below a certain predetermined value, i. e., approaches the ambient pressure within the inlet line 30 and interior tank volume 40 to a predetermined differential, the transducer or sensor 38 sends a signal to the electric drive means 28 to initiate operation of the drive means or motor 28, thereby actuating the pneumatic pump 22. As pressure again builds in the supply line 24 (with volume being controlled optionally by a constant flow restrictor 46, e. g., needle valve or the like) to the point that sufficient pressure is raised to force air from the lower end 18 of the dip tube 16, the sensor or transducer reduces or terminates the signal output through external electrical line 44, to terminate operation of the electric drive means or motor 28. Pressure, which may be equated to liquid pressure head or depth and thus to liquid quantity when the tank configuration and volume are known, may be indicated by a pressure gauge 48 installed within the supply line 26.

It is important to note that the flow restrictor 46 is not a regulator, but rather acts only to limit the volume of air or gas passing through the delivery line 24, thus allowing a smaller pump 22 and drive means 28 to be used. The same effect may be obtained by reducing the internal diameter of the delivery line 24, and/or the dip tube 16.

Also, the pressure transducer 38 is clearly not a regulator, as it is not placed in series in the delivery line 24, as in the case of a conventional system utilizing a regulator (discussed below in the discussion of prior art FIG. 4). The only true regulator in the present system illustrated schematically in FIG. 1, is the motor or drive means 28 itself, which is actuated and deactivated according to input signals from the sensor 38 to control the pneumatic pump 22. The sensor 38 does nothing to regulate gas pressure through the supply line 24, as (1) it is not placed in series with that supply line 24, and thus cannot control flow through the line 24, and (2) no air or gas flows through the sensor 38. The sensor 38 acts to block flow therethrough, and only measures the differential pressure between its high pressure side 42 and low pressure side 36.

The system illustrated schematically in FIG. 1 and described in detail above, serves well as a liquid quantity indicator in a closed tank system, for monitoring fuel quantity in a vehicle tank, water, oil, or other liquid level in a fixed storage tank, etc. When the interior shape and volume of the tank is known, any given liquid level within the tank can be equated to a volume or quantity of liquid within the tank, as is well known. As the air or gas pressure within the delivery system is essentially equal to the pressure head, and thus the depth, of the liquid within the tank, the pressure gauge 48 may be calibrated to indicate the quantity of liquid within the tank, rather than merely indicating the pressure of the liquid head or depth in the tank.

Figure 4:
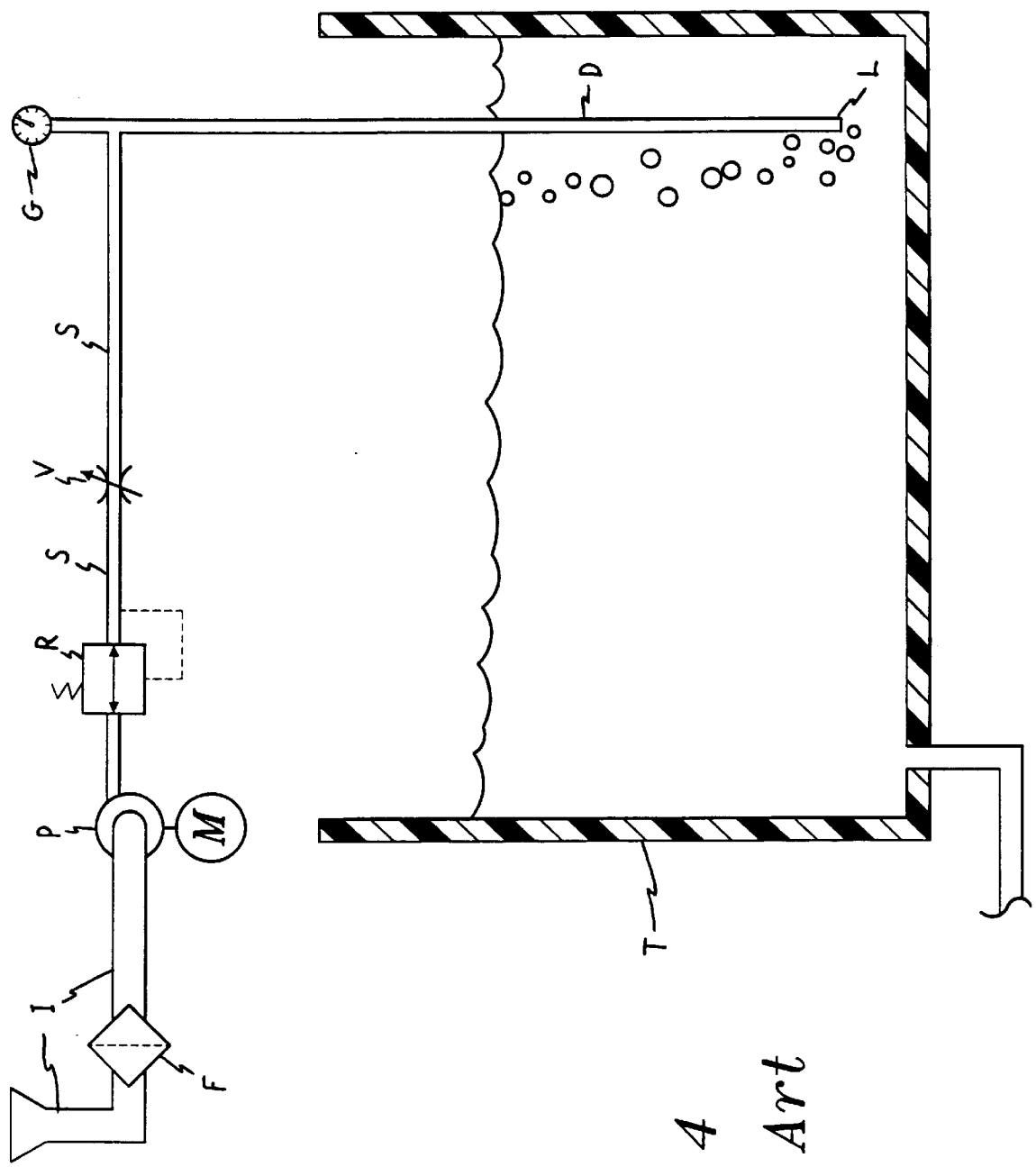
FIG. 4 is a schematic elevation view of a prior art air bubble or purge type depth measuring system.

FIG. 4 provides an illustration of a conventional prior art system, to make clear the differences between the prior art purge type systems and the present invention. In FIG. 4, a conventional open liquid tank T has a dip tube D extending downwardly into the tank T to terminate at a lower end L near the tank T bottom. An air supply line S including an inline restrictor valve V and inline regulator R supplies air from a pneumatic pump P, which is in turn driven by a motor M. Air is supplied through an inlet line I, which may include a filter F. Pressure in the system is read by means of a pressure gauge G. The prior art system of FIG. 4 may also be applied to a closed tank system, by positioning the inlet line I to draw air from the enclosed volume within the upper portion of such a closed tank.

The conventional prior art system of FIG. 4 operates by continuously supplying air through the supply line S, by means of the pump P and motor M. The pump P must operate continuously, and thus the motor M operates continuously as well. The regulator R situated in series in the supply line S, is the means used to regulate the air pressure in such conventional systems. The regulator R operates completely independently of the motor M, with a control circuit or loop C providing feedback from the pressure of the supply line to the regulator R. Such prior art systems are cumbersome due to the larger motor M required to supply pressure above that of the supply line S, with the regulator R reducing the pressure as required. Additional energy is also required due to the larger motor M and pump P, and continuous motor operation.

In contrast, the various embodiments of the present system use the motor or pump drive means itself as the pressure regulating component, rather than a separate regulator. The regulating motor is controlled by a pressure transducer, but the transducer does not control air or gas flow therethrough, unlike the regulator R of prior art purge bubble systems. In fact, the pressure transducers utilized with the present inventive system do not allow any passage of air or gas therethrough, as noted further above, and thus cannot be installed in series in the delivery or supply line, whereas a regulator must be installed in series with the air supply line in order to function.

Figure 2:
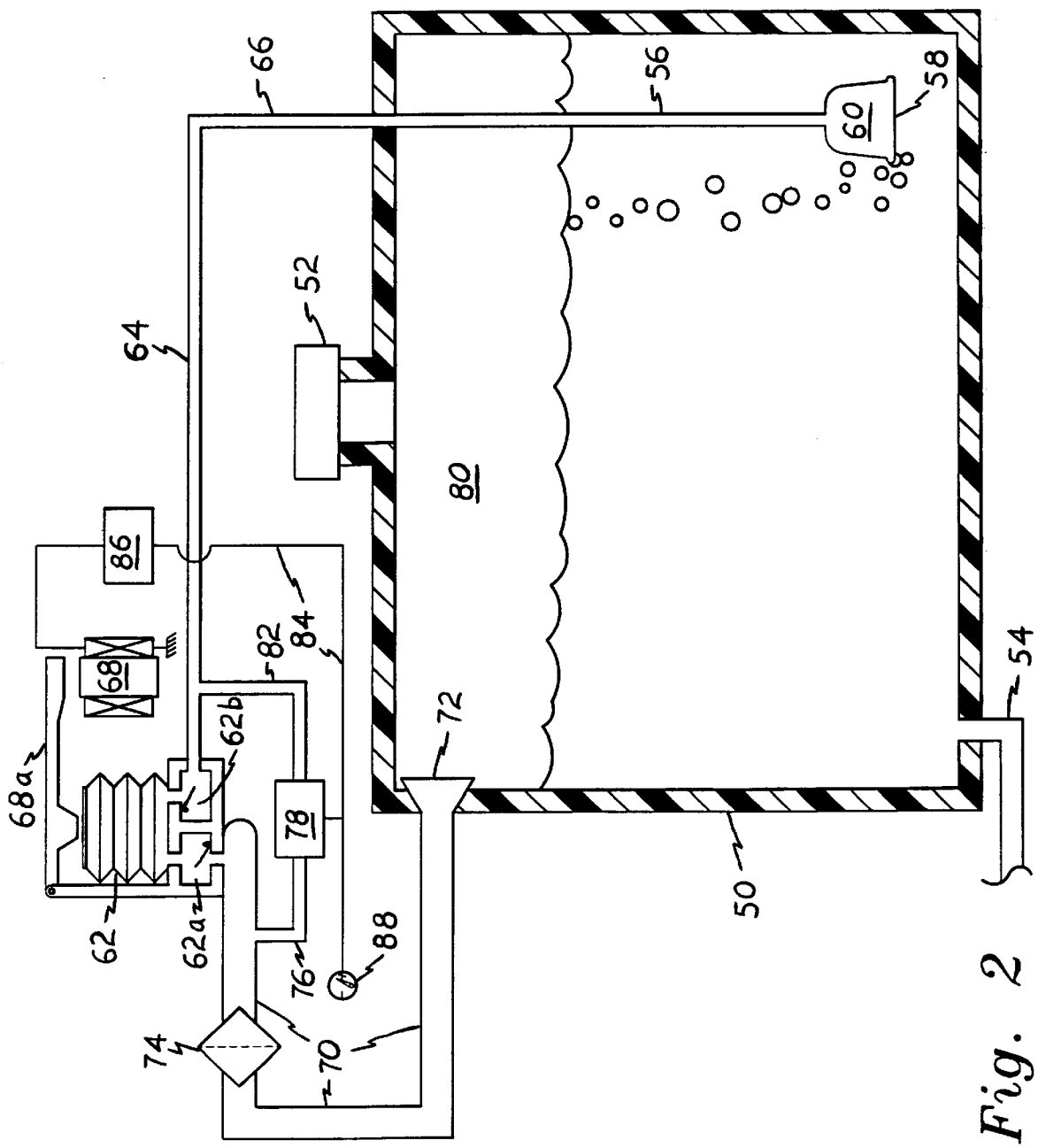
FIG. 2 is a schematic elevation view of a second embodiment of the present invention installed with a closed container, showing an alternative configuration which eliminates the regulator valve.

FIG. 2 illustrates an alternative embodiment of the present invention, wherein a pulse type motor and pump are utilized. As noted above, the drive means for the pneumatic pump used in the present purge tube system embodiments does not operate continually.

Thus, a pulse type drive means which delivers a reciprocating stroke to a valve type pump, is ideally suited for use with the present invention. In FIG. 2, a conventional closed tank 50 includes an inlet and cap assembly 52 and outlet 54, as in the tank 10 assembly of FIG. 1. A dip tube 56 extends through the wall of the tank 50, with an open lower end 58 terminating near the bottom of the tank 50. The lower end 58 of the dip tube 65 is optionally provided with a relatively wider diameter bell mouth 60, as in the embodiment of FIG. 1.

The system of FIG. 2 also includes a pneumatic pump 62 which delivers air or other purging gas to the tank 50 by means of a gas delivery line 64, which connects to the upper end 66 of the dip tube 56. The pump 62 is driven by an electric drive means 68, comprising a solenoid which is preferably provided integrally with the pump 62. The solenoid 68 is periodically or intermittently supplied with electrical current, to draw the pump actuator arm 68a downwardly to actuate the pump bellows 62. Experimentation has shown that a relatively small microminiature air pump or the like is adequate to provide pressure for relatively deep (i.e., a couple of feet or more) tanks and corresponding liquid head pressures. The pump 62 of the system of FIG. 2 comprises a bellows type reciprocating pump, having an inlet valve 62a and outlet valve 62b which communicate respectively with the inlet line 70 and outlet or delivery line 64 of the system. As in the case of the system of FIG. 1, the inlet line draws air or gas from the interior of the tank 50 by means of an inlet port 72, and may include a filter 74.

A differential pressure sense line 76 extends from the inlet line 70 to provide inlet air or gas pressure to a differential pressure transducer 78, which device may be identical to the transducer 38 of the system of FIG. 1. The transducer 78 communicates pneumatically with the interior volume 80 of the tank 50, by means of the air or gas inlet line 70. Accuracy of the system of FIG. 2 may differ from the system of FIG. 1, due to the avoidance of line pressure drops due to the filter.

An air or gas pressure sense line 82 extends from the air or gas delivery line 64 to communicate with the opposite pressure side or port of the pressure transducer 78, generally in the manner shown for the system of FIG. 1, described further above. The transducer 78 operates in the same manner as the transducer 38 of FIG. 1, by determining the pressure differential between the ambient pressure inlet side 70, 76 and higher pressure outlet side 64, 82 of the system, and sending a control signal to the motor or drive means 68 via an electrical line 84. It will be seen that the system of FIG. 2 does not include any form of metering valve, as in the needle valve 46 of the system of FIG. 1. For systems in which the liquid volume or level changes relatively slowly, e. g., vehicle fuel tanks, a rapid response rate is not required, and thus the additional purge gas control provided by the metering valve 46 is not needed in the system of FIG. 2.

Figure 6:
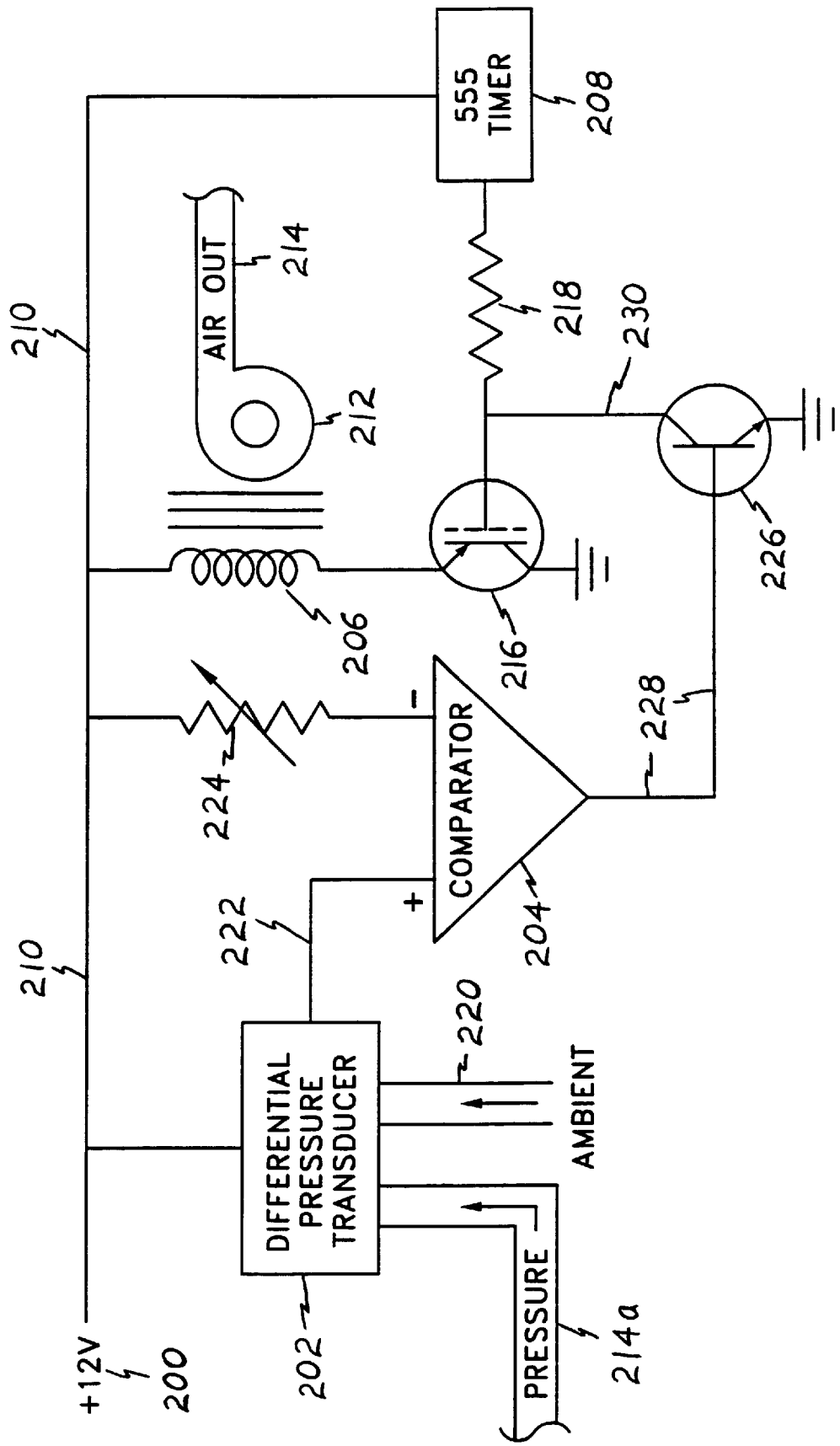
FIG. 6 is a schematic diagram of the basic electrical circuitry of the present liquid depth measuring system.

The FIG. 2 system also includes a pulse generator or timer 86 which communicates with both the transducer 78 and the motor or solenoid 68 windings, generally as shown; a more detailed electrical schematic for such a circuit is shown in FIG. 6 and discussed in detail further below. The timer 86 generates a series of electrical pulses (e. g., eighty pulses/minute, more or less, as required) which actuate the motor or solenoid 68. The pressure transducer 78 communicates with the timer 86, to deactivate the timer 86 (and thus the pump drive 68) when the gas pressure, and thus the liquid quantity in the tank 50, reach a predetermined level. The transducer 78 may also drive a quantity gauge 88.

The system of FIG. 2 thus operates the pneumatic pump drive motor or solenoid 68 only periodically or intermittently, in keeping with the needs of the system. When the pressure transducer 78 senses a pressure differential between the inlet side 70 via the inlet sense line 76, and the outlet side 64 via the outlet sense line 82, which is less than a predetermined maximum (preferably set to indicate a maximum pressure differential or head for a full tank 50), the transducer provides a signal to the motor or drive means 68 via the timer 86 to actuate the drive means and thus actuate the pump 62. The pump 62 supplies air (or other gas) to the dip tube 56 via the delivery line 64, and in accordance with the intermittent signals provided by the timer or pulse generator 86.

It has been found that the system of FIG. 2 can be adjusted for the pump 62 to provide a stroke producing a volume equal to only a single small bubble emitted from the lower end 58 of the dip tube 56. The solid state pressure transducer 78 used with the present invention, is capable of measuring a difference in pressure head on the order of the diameter of such a single small bubble emitted from the dip tube 56 (approximately $\frac{1}{64}$ inch), and thus can provide an exceedingly accurate readout of the contents of the tank 50. The reciprocating bellows pump 62 and its reciprocating actuating arm 68a driven by the solenoid 68 are ideally suited for use with the present invention to provide the above described operation. However, it will be noted that other conventional motor and pump types may be used as desired, e. g., rotary stepper motors and vane type pumps, reciprocating piston pumps, etc., as desired.

Figure 3:
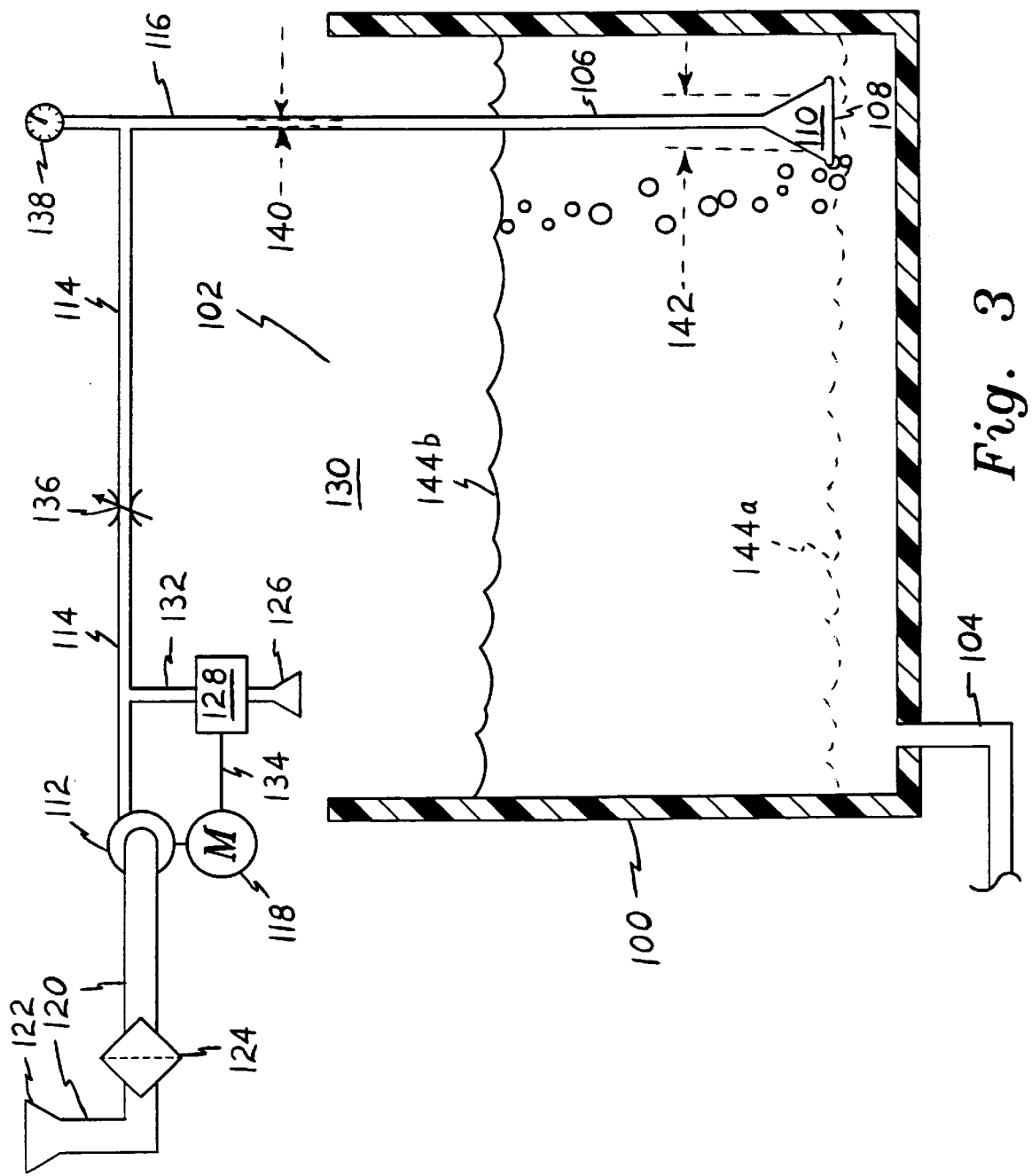
FIG. 3 is a schematic elevation view of a third embodiment of the present invention, similar to the embodiment of FIG. 1 but installed with an open container.

FIG. 3 illustrates a further embodiment for use with an open tank or container 100. The embodiment illustrated generally in FIG. 3 is ideally suited for accurately detecting the level of a liquid in a container where the liquid level is rapidly changing. Such an operating environment occurs in automobile manufacturing, where an accurate quantity of fluid (oil, hydraulic fluid, etc.) must be placed within various mechanisms of the vehicles as they complete final assembly, before being operated. It can be difficult to determine the proper quantity of fluids to add, and conventionally a slightly greater amount than is required is added to assure that the system contains sufficient fluid for proper operation and to avoid damage to the component. The fluid level is measured after operation (thus ensuring that all orifices are filled with fluid as required), with any excess fluid being drained from the system. This excess fluid must be treated as a hazardous waste, as it generally picks up certain impurities from the manufacturing process and cannot be reused. The costs of handling such hazardous waste can run into millions of dollars per year, at a major automobile manufacturing or assembly plant.

Another example of the need for extreme accuracy and speed in filling containers is found in the bottling industry, where it is critical that each bottle or container be filled to an accurate and consistent level. This is particularly true in the bottling of alcoholic beverages, where the manufacturer must pay tax on all of the beverage produced. Any overfilling of bottles results in an additional quantity passed on to the consumer, which the manufacturer has paid for in terms of manufacturing costs and expenses and also tax on the beverage. Yet, the consumer is only paying for a nominal quantity contained within the bottle or container, with the retail price including some markup to cover the tax paid by the manufacturer. In such instances where the container is overfilled, the manufacturer recovers only the costs and tax incurred in producing the nominal quantity of beverage shown on the container label, yet has paid those costs and taxes for any additional amount contained within the bottle or container. Yet, the manufacturer cannot chance underfilling the container, due to consumer protection and fair trade laws and regulations.

The system illustrated schematically in FIG. 3, provides a solution to the above described problems. The container 100 of FIG. 3 represents any open container or tank, such as an automobile or truck engine oil sump, transmission, or differential, a bottle or other open container, etc. In the case of such open containers 100, the present purge type system is inserted temporarily through a filling opening or quantity checking opening (e. g., dipstick tube, etc.) 102 of the container 100, or into the open mouth 102 of a bottle or other container 100 in the bottling industry. In the case of the automotive industry, the container 100 may include a drain passage 104 or the like. As the system is not permanently installed with the tank 100, the open area 102 at the top of the tank or container 100 represents such a temporarily open passage 102 into which the dip tube 106 may be removably placed.

As in the case of the FIG. 1 and 2 embodiments discussed further above, the dip tube 106 includes an open lower end 108 with a bell mouth 110. While the bell mouth 110 is not of critical importance in environments where the system is measuring a liquid quantity which is being depleted from the container relatively slowly (e. g., fuel systems, etc.), it becomes important in those situations where the present invention is used to provide a signal when a predetermined liquid level is reached in a container, and to immediately shut off the flow of the liquid to the container.

The system of FIG. 3 will be seen to resemble the closed system illustrated schematically in FIG. 1, comprising a pneumatic pump 112 which provides pressure to the dip tube 106 via an air delivery line 114 which connects to the upper end 116 of the dip tube 106. The pump 112 is driven by some form of electric drive means 118 (motor M, solenoid, etc.), as in the embodiments of FIGS. 1 and 2 discussed further above. An air inlet line 120 having an inlet opening or passage 122 open to ambient air pressure, provides air to the pump 112. A filter 124 may be installed in the inlet line 120, as required. An ambient air pressure inlet line 126 provides a source of ambient air pressure for the pressure transducer 128, from the open area 130 in the vicinity of the container 100. Air pressure from the delivery line 114 is provided to the transducer 128 via a second transducer sense line 132, with the transducer 128 communicating electrically with the drive means 118 via an electrical line 134, as in the other embodiments of FIGS. 1 and 2.

While not absolutely necessary for operation of the open container filling system of FIG. 3, a restrictor valve 136 (analogous to the valve 46 of the system of FIG. 1) may be placed in the delivery line 114, downstream of the pump 112 and serving the same function as the analogous valve 46. A pressure gauge 138, or "go—no go" lights, etc. may be provided in the delivery line 114 and dip tube 116 system, if so desired. However, such a pressure gauge 138 does not serve well as a visual indication of liquid level within the container 100, due to the rapid fill rate which may be used to fill the container using the present system of FIG. 3 to shut off liquid flow at a predetermined point.

When the system of FIG. 3 is applied to a conventional liquid filling means for a container 100, the pressure transducer 128 provides a signal to the filling means via a conventional output and electrical line (not shown). When the liquid level reaches a predetermined point, the air pressure within the system rises accordingly as the transducer 128 senses the increasing air pressure within the dip tube 106 and its corresponding air delivery line 114. When the air pressure within those lines 106 and 114 increases to a certain predetermined point corresponding to a certain predetermined head pressure or depth for the liquid within the container 100, the transducer 128 signals the corresponding filling mechanism to shut off the mechanism, thereby immediately stopping inflow to the tank or container 100 at the desired liquid level. The present system operates extremely rapidly, shutting off flow at a preset level varying by only a small fraction of an inch.

The delivery line air pressure sensed by the transducer 128 is critical to the function of the above described liquid shutoff system of FIG. 3. It has been found that the bell mouth opening 110 at the lower open end 108 of the dip tube 106, is of great value in providing a rapid signal of rising air pressure to the transducer 128. Again, the bell mouths 20 and 60 shown with the quantity indicator systems of FIGS. 1 and 2, are not necessarily required in those operating environments where the liquid quantity changes relatively slowly and a rapid shutoff response is not required at a precise liquid level. However, the various shapes of the bell mouths 20, 60, 110, and others, may be applied to the lower end(s) of the dip tube(s) to produce an effective decrease in response time for the shutoff signal from the transducer.

The operating principle of the bell mouth opening 110 (and others) is based upon the difference in relative internal diameters or cross sectional areas between the dip tube 106 and the bell mouth 110. In the example of FIG. 3, the dip tube 106 will be seen to have a relatively narrow and restricted internal diameter 140, while the bell mouth 110 has a much larger average internal diameter 142. While the shapes of the various bell mouths 20, 160, 110, etc. may be configured as desired, the internal diameters or cross sectional areas of these various bell mouth shapes is universally larger than the dip tubes from which they depend. The specific internal shapes of the bell mouths may be configured as desired to provide the desired response times or characteristics for the system, depending upon its operating environment.

In order to understand the operation of the bell mouth component of the present liquid fill shutoff invention, the container 100 should be pictured with the liquid level 144a at a very low level, beneath the lower lip or opening 108 of the bell mouth 110. As liquid is introduced into the container 100, e. g. by a conventional bottling or other filling system, the liquid level will rise in the container 100 until reaching some predetermined desired level, e. g., the higher level 144b shown in the container 100 of FIG. 3. As the liquid level rises, it will be seen that a volume of air will become trapped within the interior volume of the bell mouth 110. The larger average diameter 142 of the bell mouth, in comparison to the internal diameter 140 of the dip tube 106, results in a greater volume of air being trapped within the bell mouth 110 per unit of column height in comparison to the volume of air per unit of column height contained within the dip tube 106 and its relatively narrow diameter delivery line 114.

As the liquid level continues to rise, it will be seen that the sudden increase in head pressure forces the air contained within the bell mouth 110 and dip tube 106, upwardly through the tube 106 and delivery line 114. The volume of air originally trapped within the bell mouth 110 must extend to a relatively narrow and tall column height within the dip tube 106, due to that air volume retaining nearly its original volume due to the nearly constant pressure (the pressure increases only slightly, due to the increase in liquid depth and corresponding head pressure).

The narrow and tall column of entrapped gas within the dip tube 110 and delivery line 114, thus causes the pressure transducer 128 to respond much more rapidly to the change in air pressure, thus resulting in a much more rapid shutoff of any inflow controlled by the transducer than would otherwise be the case with a constant diameter dip tube and dip tube opening or mouth. The response rate provided by the present system is in accordance with the rate of travel of the pressure wave of the entrapped air in the dip tube and delivery line, which is essentially sonic velocity or on the order of 1100 ft/sec. The greater volume, and corresponding greater air column height, provided by the bell mouth 110 (and others, in other embodiments) also provides an air lock, precluding the entrance of liquid into the pressure sensing line and port 132 of the transducer 128 to preclude damage to the transducer 128 due to liquid communication therewith.

The air or gas compression bell 20, 60, 110, etc. can also assist in allowing air or other entrapped gas(es) to escape from the container during the filling operation. The external contours of the bell can influence the flow of the liquid as it enters the tank or container, thereby providing a clear route for air from within the tank or container to escape as liquid enters the container. This is particularly important in open containers having relatively narrow necks or filling openings or passages, e.g., automotive or truck engine crankcases, transmissions, differentials, etc. being filled during vehicle manufacture, and bottles and the like during filling at bottling plants.

Figure 5:
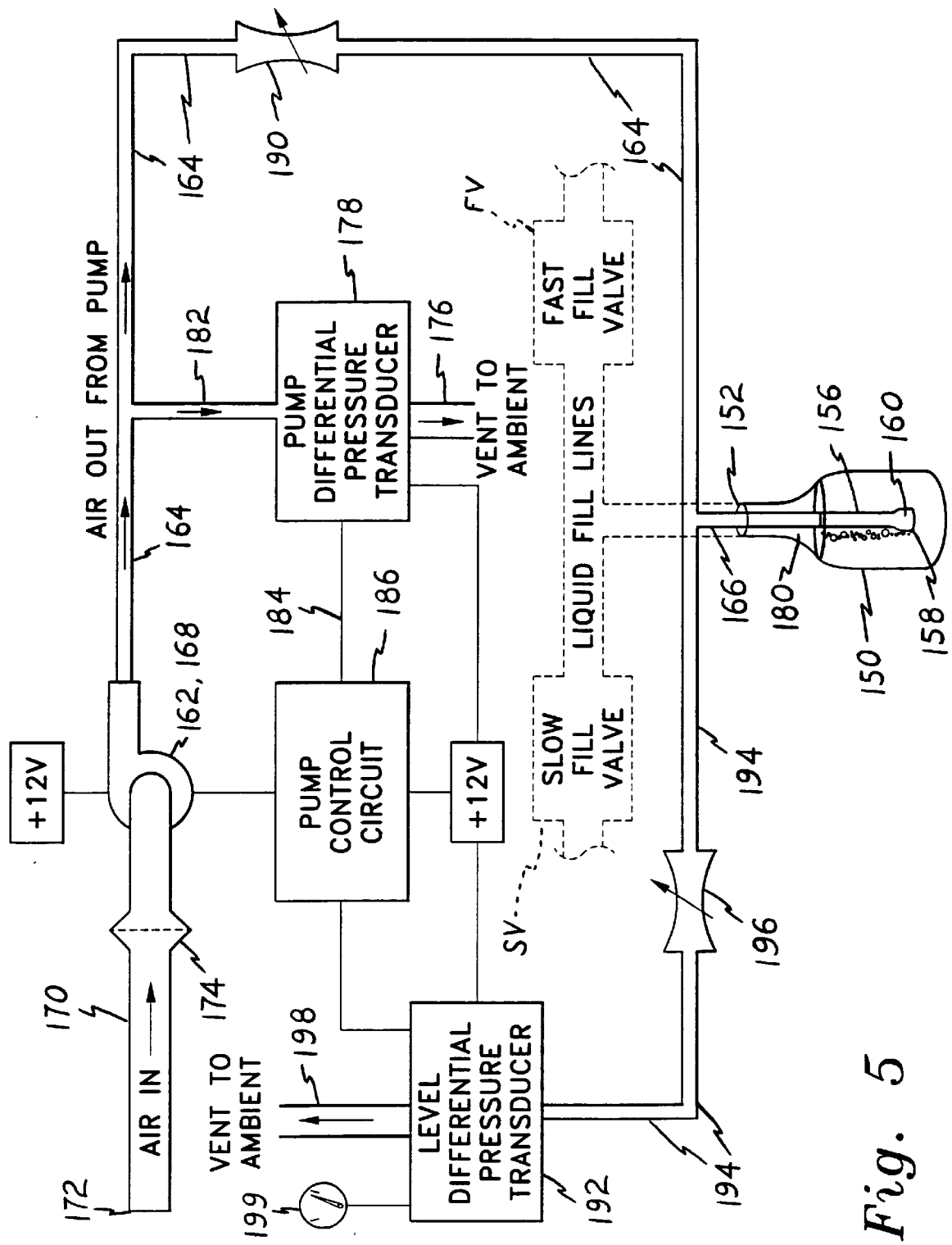
FIG. 5 is a schematic diagram of the basic pneumatic circuitry for the present invention, adapted for use in the bottling industry.

FIG. 5 of the drawings provides a schematic illustration of the general pneumatic circuitry for a bottle or other container filling system incorporating the present invention. The system of FIG. 5 includes a second differential pressure transducer, in order to control the filling pump(s) or valve(s) of the filling system. Otherwise, the system of FIG. 5 will be seen to closely resemble the filling system shown in FIG. 3 and discussed further above.

The system of FIG. 5 operates essentially as described for the system of FIG. 3, with the system being used to fill a bottle 150 having an open mouth or neck 152. A dip tube 156 extends downwardly into the bottle 150, with the dip tube having an open lower end 158 with a bell mouth 160 depending therefrom, as in other embodiments discussed further above. (It will be seen that for bottling operations, the critical level is near the top of the bottle 150, and the dip tube 156 need not extend very far into the bottle. The length of the dip tube 156 is exaggerated in FIG. 5, for clarity in the drawing Figure.) A pneumatic pump 162 supplies air to a delivery line 164, which communicates pneumatically with the upper end 166 of the dip tube 156. The pump 162 is driven by some form of electric drive means 168, powered by an electrical power source (e. g., twelve volt DC, or other values as required). The pump 162 and motor or electric drive means 168 are illustrated as a single unit in FIG. 5, as they would conventionally be provided.

The pneumatic pump 162 draws air from an inlet line 170 having an inlet opening 172. A filter 174 is preferably provided where ambient air is used as the gas in the system. An inlet or ambient pressure line 176 provides ambient pressure to a first differential transducer 178, analogous to the transducers 38 of FIG. 1, 78 of FIG. 2, and 128 of FIG. 3. The ambient pressure in such an open system will be seen to be equal to the pressure of the air volume 180 contained within the upper portion of the bottle or container 150. System pressure is applied to the opposite side or port of the transducer 178 by means of the pressure supply line 182. It should be noted that although directional arrows are shown in the pump pressure and ambient pressure sides 182 and 176 of the pressure transducer 178, that there is no flow through the transducer. These arrows merely indicate the pressure bias from high to low pressure, across the transducer.

The pump differential pressure transducer 178 provides a signal to the pump control circuit 186 (pulse generator/timer) via an electrical output line 184, analogous to the timer 86 and line 84 of the system of FIG. 2. The pump control pulse generator and timer 186 then provides a control signal to the pump motor 168 to drive the pump 162 as required. Additional componentry, such as a restrictor valve 190 for reducing air volume, may be included in the pneumatic circuit as required.

It is important to note that in this filling circuit, the pump differential transducer 178 merely detects pressure in the pneumatic pump output line 164, which is essentially equal to the pressure head of the liquid in the bottle or container 150, to signal the pump motor 168 as needed. It will be noted that a second pressure transducer 192 is provided downstream of the bottle or container 150 being filled, and communicates with the pneumatic line 164 from the first transducer 178 to the container 150 by means of a fill pressure output line 194. Another restrictor valve 196 may be included in the output line 194 to act as a "snubber" to smooth out any pulses in the pneumatic pressure before the pressure signal is received by the second transducer 192. The second or level differential transducer 192 determines differential pressure by means of a low pressure or vent side 198 to ambient pressure, as in the case of the first or pump differential transducer 178.

The pneumatic system of FIG. 5 operates by sensing pneumatic pressure in the system according to the liquid level in the container 150 being filled. Initially, the container 150 is empty, with the pneumatic system recognizing this due to the lack of head pressure in the container 150. This is detected by the pump differential pressure transducer 178, as both the pressure side 182 and ambient side 176 of the transducer 178 are essentially equal in pressure.

This lack of head pressure, indicating that the container 150 is empty (or at least, the liquid level has not yet reached the bottom end 158 of the dip tube 156), causes the transducer 178 to signal the fast fill valve FV to fill the container 150 via conventional control circuitry, not shown. The fast fill valve FV operates at a rate on the order of 14.4 gallons per minute (gpm), which results in the filling of a one liter bottle in approximately one second. The liquid level or quantity within the container 150 cannot be controlled sufficiently accurately using such a rapid fill rate. However, as the bottle 150 becomes approximately ¾ filled, the liquid level reaches the lower end 158 of the dip tube 156 (again, it is noted that the length of the dip tube 156 is exaggerated in FIG. 5, for clarity in the drawing), whereupon the pneumatic pressure in the delivery and output pneumatic lines 164 and 194 rises suddenly due to the rapid increase in head pressure of the rapidly rising liquid level in the container 150.

When this occurs, the second or level differential pressure transducer 192 detects the sudden rise in pneumatic pressure and shuts off the fast fill valve FV and opens the slow fill valve SV via conventional control circuitry (not shown). The last quarter (approximately) of the container 150 is filled by flow from the slow fill valve SV, which can be controlled much more accurately than the level resulting from fill using the fast fill valve FV. When the liquid reaches the predetermined desired level, the pneumatic pressure in the delivery line 164 builds accordingly to signal the first transducer 178 to shut off all fill valves.

Figure 7:
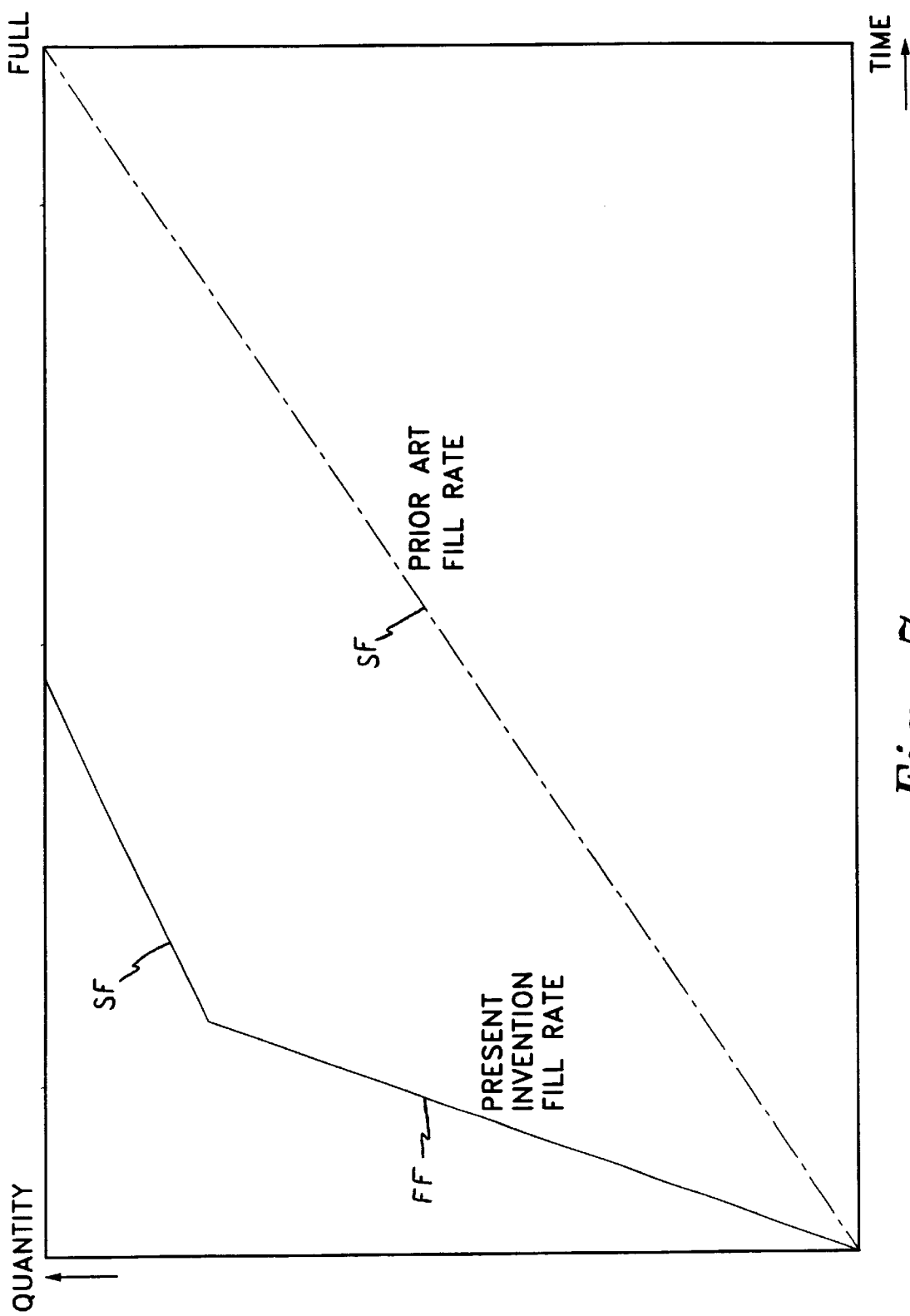
FIG. 7 is a graph illustrating the rapid fill rate achievable using the present system in the bottling industry.

The above described pneumatic system and its operation result in bottle or container filling operations requiring considerably less time than in the past, using conventional filling control systems of the prior art. FIG. 7 illustrates a graph comparing the prior art fill rate with the fill rate provided by the present container filling control system discussed above. In prior art filling systems, a relatively slow fill rate SF was required for the entire filling operation of a container, in order to achieve a reasonably accurate final fill level. This is primarily due to the liquid level sensing systems used in the prior art, which are sensitive to splashing, foaming, and other irregularities in the surface level of the liquid in a container during the turbulence incurred in filling operations.

The present system essentially senses the weight (and hence the quantity) of liquid within the container, due to the pressure head developed by the increasing column height of liquid within the container as it is being filled. The only reason for requiring a relatively slower fill rate toward the end of the filling process using the present system, is due to the difficulty in precisely shutting off the flow from a rapid fill valve to achieve the desired filling accuracy. Thus, the present system can fill most of the container very rapidly using a fast fill valve, only slowing the rate of fill as the liquid approaches the desired level. The slow fill rate can be precisely controlled using the present system, with a net result of the accurate filling of containers in about one quarter of the previous time required. Alternatively, the fill rate may also be controlled by means of a variable speed fill pump, rather than separate fast and slow rate valves. Regardless of the means of controlling liquid inflow to the container, the critical point is being able to sense precisely when the desired liquid level is reached in the container.

FIG. 6 provides a schematic diagram of the basic electrical circuitry used to control the operation of the present liquid depth sensing system, as in a fuel quantity measuring system or similar system where a rapid response rate is not required. It will be noted that none of the pneumatic components (other than the "air out" pneumatic delivery line from the pneumatic pump) are shown in FIG. 6. All of the electrical components, as well as the pneumatic line immediately adjacent the pneumatic pump, are all disposed externally to the tank, with none of the electrical componentry of the present invention being placed within the tank or container itself.

Electrical power is provided by a twelve volt source 200, or other suitable electrical power source (battery, rectified ac, etc.). Electrical power is provided to the gas differential pressure sensing transducer 202 (e. g., Motorola Micromachines, tm), voltage comparator 204, electromagnetic coil 206 (i. e., motor or solenoid windings), and the pulse generator 208 (e. g., 555 timer) wired in parallel to a voltage supply line 210.

The pump motor or solenoid (via its windings 206) operates the pneumatic pump 212 to supply air to the pneumatic system (e. g., FIG. 5) via an air delivery line 214. The motor coil or winding 206 is selectively grounded through field effect transistor (FET) 216, with motor operation occurring when the FET 216 grounds the coil or winding 206 of the motor or solenoid. Other transistor or electronic switching means may be used as desired; the FET 216 is used due to its extremely rapid switching rate.

The pulse generator or timer 208 provides periodic pulses of electrical energy (e. g., 80 Hz, more or less, as desired) to the base of the FET 216. A resistor 218 (e. g., 10 kohm, or as required) may be provided between the timer 208 and base of the FET 216, to limit current flow to the FET. Each time the timer 208 pulses, the FET 216 closes across the emitter and collector to provide a ground path for the motor or solenoid coil or winding 206, thereby actuating the pneumatic pump 214.

It will be seen that the 555 timer 208 is particularly well suited for use in a circuit using a solenoid actuated bellows type pump, such as the pump and motor 62, 68 shown in the system of FIG. 2 of the drawings and discussed further above. Such devices conventionally open the coil circuit at the completion of a full stroke of the pump, when the actuator arm contacts the core of the solenoid winding. However, the present circuit controls the coil or winding 206 by selectively opening its ground through the FET 216 by means of the comparator 204. This enables the present circuit to control the pump drive means to a much finer degree, with the coil activating the pump incrementally through partial strokes or cycles, depending upon the signal to the FET 216.

The differential pressure transducer 202 receives air (or other gas) from the air or gas delivery line 214, via a branch 214a as in the manner of the other systems described further above. Ambient pressure (e. g., open air, or pressure in a closed tank or container or air supply line, etc.) is provided to the transducer 202 from an ambient sense line 220.

The transducer 202 enters into control of the pneumatic pump 212 by controlling the signal from the timer or pulse generator 208 to the FET 216. When the liquid within the container is lower than some predetermined level, it is important to monitor the quantity of liquid within the tank. Hence, the pulse generator periodically actuates the motor winding 206 to operate the pump 212, to keep the pressure up through the dip tube of the system so the differential pressure transducer 202 can monitor the pressure and provide a signal to a gauge (e. g., conventional electrical or electronic quantity gauge 199, as shown in FIG. 5 of the drawings).

However, when the container is nearly full, the pump 212 may be deactivated if desired, as would be the case in bottling or drink dispensing operations where the container is removed from the system after filling. This is achieved by means of the transducer 202. The transducer 202 communicates electrically with the voltage comparator 204 (e.g., a 311N comparator, or other suitable device) via electrical line 222. When a predetermined level of pneumatic pressure is provided by the input line 214a, the transducer 202 output signal reaches a level (e. g., one to five volts) sufficient to trigger the comparator 204. The actuation of the comparator 204 may be adjusted by tuning the input voltage to the comparator 204 by means of an adjustable resistance (potentiometer) 224, installed in the voltage supply line between the supply line 210 and the comparator 204. (It should be noted that the negative sign at the comparator is only in reference to the supply voltage, and not in reference to absolute ground state of the circuit.)

The comparator 204 sends a signal (e. g., two volts) to the base of the npn transistor 226 via line 228, to control the ground state of the transistor 226. When the transistor 226 receives a signal from the comparator 204, the transistor 226 grounds the signal from the pulse generator or timer 208 by means of line 230, which extends between the line from the timer 208 to the base of the FET 216 and the collector side of the npn transistor 226. Thus, when the npn transistor 226 is grounded by a signal from the comparator 204, which in turn was signaled by the pressure transducer 202, all signals from the pulse generator or timer 208 are grounded through the npn transistor 226, and do not go to the FET 216. The ground across the emitter and base of the FET 216 remains open, thereby preventing current flow through the motor coil or winding 206 to prevent operation of the pneumatic pump 212.

Figure 8:
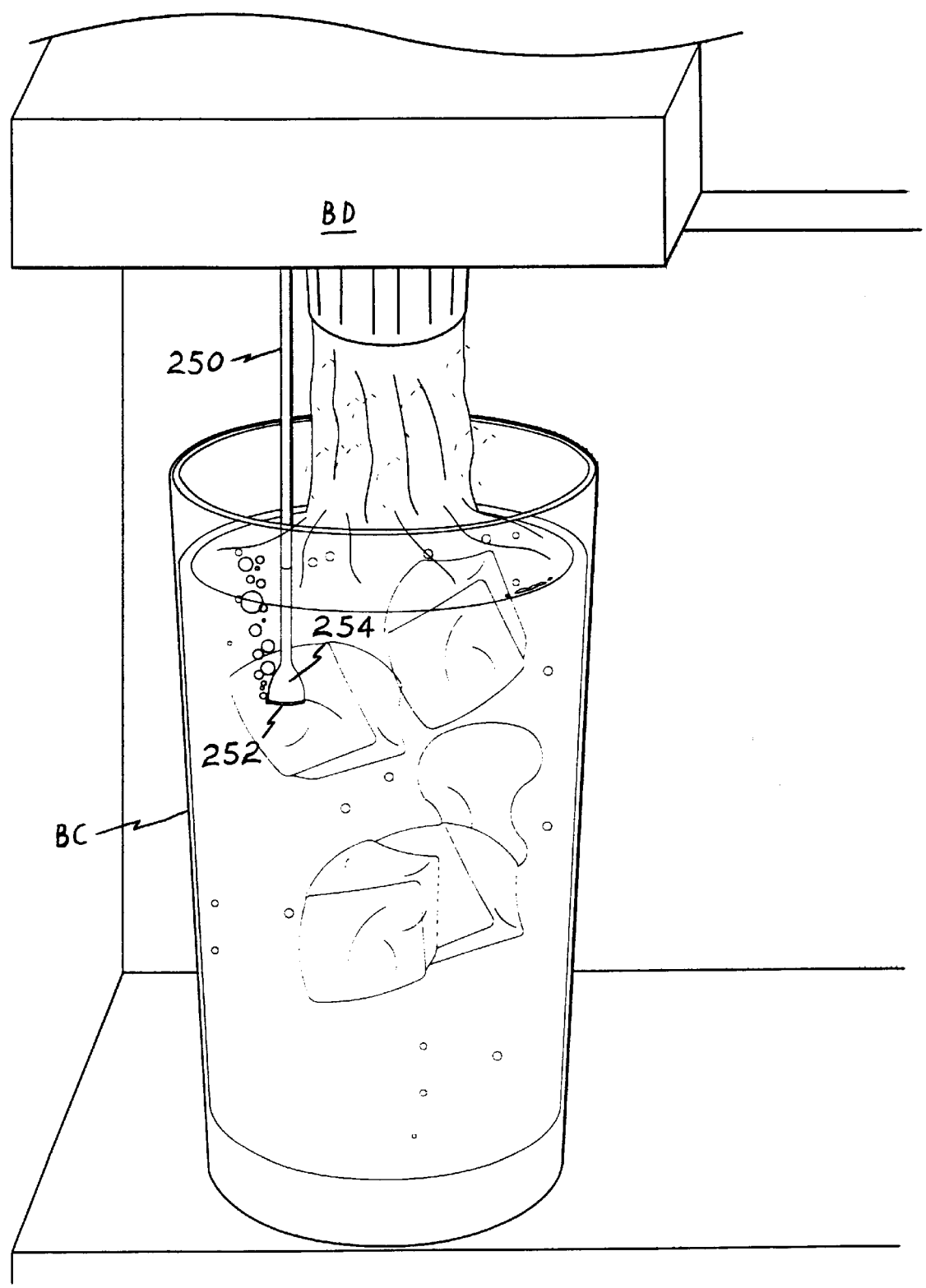
FIG. 8 is an environmental elevation view illustrating the dip tube with its bell mouth installed with a drink dispensing machine, for use therewith.

FIG. 8 illustrates yet another application for the present liquid depth sensing system, in which a beverage dispenser BD equipped with the present system, including a dip tube 250 with open lower end 252 and bell mouth 254, is used to fill a beverage container BC. The system of the environmental drawing of FIG. 7 is essentially like the system of the pneumatic schematic of FIG. 5 for bottling operations. Essentially, the beverage container BC is filled at a relatively rapid rate until air is forced up the dip tube by the air volume captured within the bell mouth 254 due to the liquid level reaching the lower end 252 of the dip tube 250. When this occurs, the system signals the dispenser BD to shut off, or to fill at a slower rate until the shutoff point is reached.

The present invention, when used to control the output of a beverage dispenser BD as in FIG. 7, provides a much more accurate means of filling a beverage or other container than systems used in the prior art. Moreover, the present system is essentially immune to foam, ice, splashing, etc., which are generally a part of many dispensed beverages. As noted further above, the present system actually measures the head pressure or depth of the liquid above the lower end 252 of the dip tube 250, thereby automatically compensating for ice and other substances within the container BC. Carbonation does not effect the present system, as any carbon dioxide which comes out of solution and enters the dip tube 250, expands to assume the ambient pressure of the air or gas within the dip tube 250. The filling accuracy thus achieved is a significant advance over prior art systems.

In conclusion, the present liquid depth sensing system in its various embodiments, provides significant advantages over prior art systems used for detecting the depth or level of a liquid in a container. The present system eliminates the weight, bulk, unreliability, and high maintenance requirements of a conventional pressure regulator, by regulating purge pressure by means of the pneumatic pump motor or drive itself. In turn, the pump motor or drive is controlled by a small, lightweight, and extremely reliable solid state differential pressure transducer to provide accuracy on the order of small fractions of an inch, which accuracy has heretofore been unobtainable with prior art conventional systems.

Purge systems in general, and particularly the liquid depth sensing system of the present invention, are particularly well suited for use in measuring the depth or quantity of flammable liquids (fuels, etc.) contained within closed tanks, due to the lack of any electrical componentry or energy entering or passing through the tank as a part of the sensing system. The present system provides further advantages for use with vehicle fuel systems, as it is essentially immune to vibration due to the solid state electronics used in the external controls, as opposed to conventional pressure regulators which require relatively high maintenance, particularly in environments subject to vibration. Moreover, the present system is not orientation or temperature sensitive, as are conventional pressure regulators which must be mounted upright with the diaphragm oriented horizontally and maintained within a relatively narrow temperature range for optimum accuracy.

The present system is also adaptable for use in filling operations, for determining when the desired liquid level has been reached. This has been a major problem in automotive manufacturing and assembly plants, where transmissions, differentials, engine crankcases, etc. are typically slightly overfilled, with the excess being drained and discarded as hazardous waste. The present system eliminates this costly excess, which provides significant savings to manufacturers. Where the present system is used as a fill level indicator, a simple system of lights may be used in lieu of a quantity gauge, if so desired.

The bottling and beverage dispensing industry will also enjoy great benefits and economy of operation by means of the present liquid depth sensing system. The provision for rapidly filling bottles and containers to a predetermined level, and then accurately topping off the container at a slower rate, greatly accelerates the bottle filling operation while still providing the required accuracy of the contents of the container. The present system is immune to problems of splash, turbulence, foaming, and carbonated beverages, which have caused problems with prior art systems. Accordingly, the present invention in its various embodiments will enjoy widespread application wherever the accurate measurement of the quantity of a liquid in a container, or filling of a container to a predetermined volume or quantity, is desired.

It is to be understood that the present invention is not limited to the embodiments described above, but encompasses any and all embodiments within the scope of the following claims.

I claim:

1. A liquid depth sensing system for measuring the depth of a liquid, comprising:

a container devoid of internal electronic componentry, for holding a liquid;

a dip tube having at least an open lower end extending into said container, for delivering a gas into said container;

said dip tube further having an upper end opposite said lower end, and an internal diameter;

a pneumatic pump disposed externally to said container, for supplying the gas;

a gas inlet, for supplying the gas to said pneumatic pump;

a gas delivery line extending between said pneumatic pump and said upper end of said dip tube, for supplying the gas from said pneumatic pump to said dip tube;

electric drive means disposed externally to said container, for driving said pneumatic pump at sufficient pressure to force the gas from said lower end of said dip tube;

gas differential pressure sensing means disposed externally to said container and communicating with said gas delivery line and said gas inlet, for determining the gas pressure within said gas delivery line downstream of said pneumatic pump;

said gas differential pressure sensing means communicating with said electric drive means for controlling said electric drive means, for regulating the gas pressure by said electric drive means as required;

a bell mouth outlet depending from said lower end of said dip tube, for capturing a volume of gas therein;

said bell mouth outlet having an internal diameter greater than said internal diameter of said dip tube;

said internal diameter of said dip tube restricting the volume of gas to a narrow and tall column, for rapidly actuating said differential pressure sensing means as the tall column of gas is pushed upwardly within said dip tube by means of the liquid entering said container;

wherein said bell mouth outlet provides an air lock, to preclude the entrance of liquid into said pressure sensing means;

at least one electromagnetic coil circuit for actuating said electric drive means;

electrical pulse actuator means, for providing electrical pulses to said electromagnetic coil circuit for incrementally actuating said electric drive means through partial cycles; and electronic switching means communicating with said electrical pulse actuator means and with said gas differential pressure sensing means, for grounding said electrical pulse actuator means and removing electrical power to said electromagnetic coil circuit, thereby terminating operation of said electric drive means and said pneumatic pump when a predetermined gas pressure is sensed by said gas differential pressure sensing means.

2. The liquid depth sensing system according to claim 1, wherein said container comprises a closed container.

3. The liquid depth sensing system according to claim 2, further including:

liquid quantity display means; and said dip tube, said pneumatic pump, said gas delivery line, said electric drive means, said gas differential pressure sensing means, and said liquid quantity display means comprise a liquid quantity monitoring system for determining the quantity of the liquid within said closed container.

4. The liquid depth sensing system according to claim 1, wherein said container comprises an open container.

5. The liquid depth sensing system according to claim 4, wherein said dip tube with said bell mouth outlet, said pneumatic pump, said gas delivery line, said electric drive means, and said gas differential pressure sensing means further comprise an open container fill system for rapidly and accurately filling an open container to a predetermined level.

6. A liquid depth sensing system for measuring the depth of a liquid, comprising:

a container devoid of internal electronic componentry, for holding a liquid;

a dip tube having at least an open lower end extending into said container, for delivering a gas into said container;

said dip tube further having an upper end opposite said lower end, and an internal diameter;

a pneumatic pump disposed externally to said container, for supplying a gas;

a gas inlet, for supplying the gas to said pneumatic pump;

a gas delivery line extending between said pneumatic pump and said upper end of said dip tube, for supplying the gas from said pneumatic pump to said dip tube;

electric drive means disposed externally to said container, for driving said pneumatic pump at sufficient pressure to force the gas from said lower end of said dip tube;

gas differential pressure sensing means disposed externally to said container and communicating with said gas delivery line and the pressure of said gas delivery line, for determining the gas pressure within said gas delivery line downstream of said pneumatic pump; and said gas differential pressure sensing means communicating with said electric drive means for controlling said electric drive means, for regulating the gas pressure by said electric drive means as required;

at least one electromagnetic coil circuit for actuating said electric drive means;

electrical pulse actuator means, for providing electrical pulses to said electromagnetic coil circuit for incrementally actuating said electric drive means through partial cycles; and electronic switching means communicating with said electrical pulse actuator means and with said gas differential pressure sensing means, for grounding said electrical pulse actuator means and removing electrical power to said electromagnetic coil circuit, thereby terminating operation of said electric drive means and said pneumatic pump when a predetermined gas pressure is sensed by said gas differential pressure sensing means.

7. The liquid depth sensing system according to claim 6, wherein said container comprises a closed container.

8. The liquid depth sensing system according to claim 7, further including:

liquid quantity display means; and said dip tube, said pneumatic pump, said gas delivery line, said electric drive means, said gas differential pressure sensing means, and said liquid quantity display means comprise a liquid quantity monitoring system for determining the quantity of the liquid within said closed container.

9. The liquid depth sensing system according to claim 6, wherein said container comprises an open container.

10. The liquid depth sensing system according to claim 9, including:

a bell mouth outlet depending from said lower end of said dip tube, for capturing a volume of gas therein;

said bell mouth outlet having an internal diameter greater than said internal diameter of said dip tube; and said internal diameter of said dip tube restricting the volume of gas to a narrow and tall column, for rapidly actuating said differential pressure sensing means as the tall column of gas is pushed upwardly within said dip tube by means of the liquid entering said container.

11. The liquid depth sensing system according to claim 10, wherein:

said dip tube with said bell mouth outlet, said pneumatic pump, said gas delivery line, said electric drive means, and said gas differential pressure sensing means further comprise an open container fill system for rapidly and accurately filling an open container to a predetermined level.

12. A liquid depth sensing system for measuring the depth of a liquid, comprising:

a container for holding a liquid;

a dip tube having at least an open lower end extending into said container, for delivering a gas into said container;

said dip tube further having an upper end opposite said lower end, and an internal diameter;

means for supplying and regulating a gas to said dip tube;

a bell mouth outlet depending from said lower end of said dip tube, for capturing a volume of gas therein;

said bell mouth outlet having an internal diameter greater than said internal diameter of said dip tube;

said internal diameter of said dip tube restricting the volume of gas to a narrow and tall column, for rapidly actuating said differential pressure sensing means as the tall column of gas is pushed upwardly within said dip tube by means of the liquid entering the container;

a pneumatic pump disposed externally to said container, for supplying a gas;

a gas inlet, for supplying the gas to said pneumatic pump;

a gas delivery line extending between said pneumatic pump and said upper end of said dip tube, for supplying the gas from said pneumatic pump to said dip tube;

electric drive means disposed externally to said container, for driving said pneumatic pump at sufficient pressure to force the gas from said lower end of said dip tube;

gas differential pressure sensing means disposed externally to said container and communicating with said gas delivery line and the pressure of said gas delivery line, for determining the gas pressure within said gas delivery line downstream of said pneumatic pump;

said gas differential pressure sensing means communicating with said electric drive means for controlling said electric drive means, for regulating the gas pressure by said electric drive means as required;

at least one electromagnetic coil circuit for actuating said electric drive means;

electrical pulse actuator means, for providing electrical pulses to said electromagnetic coil circuit for incrementally actuating said electric drive means through partial cycles; and electronic switching means communicating with said electrical pulse actuator means and with said gas differential pressure sensing means, for grounding said electrical pulse actuator means and removing electrical power to said electromagnetic coil circuit, thereby terminating operation of said electric drive means and said pneumatic pump when a predetermined gas pressure is sensed by said gas differential pressure sensing means.

13. The liquid depth sensing system according to claim 12, wherein said container comprises a closed container.

14. The liquid depth sensing system according to claim 13, further including:
   liquid quantity display means; and
   said dip tube, said means for supplying and regulating a gas to said dip tube, and said liquid quantity display means comprise a liquid quantity monitoring system for determining the quantity of the liquid within said closed container.

15. The liquid depth sensing system according to claim 12, wherein said container comprises an open container.

16. The liquid depth sensing system according to claim 15, wherein said dip tube with said bell mouth outlet and said means for supplying and regulating a gas to said dip tube further comprise an open container fill system for rapidly and accurately filling an open container to a predetermined level.

* * * * *